(12) United States Patent
Mueller et al.

(10) Patent No.: US 11,169,172 B2
(45) Date of Patent: Nov. 9, 2021

(54) METHOD AND MEASURING SYSTEM FOR MEASURING A MOVABLE OBJECT

(71) Applicant: SMS Group GmbH, Duesseldorf (DE)

(72) Inventors: Torsten Mueller, Kreuztal (DE); Thomas Haschke, Bad Berleburg (DE)

(73) Assignee: SMS GROUP GMBH, Duesseldorf (DE)

( * ) Notice: Subject to any disclaimer, the term of this patent is extended or adjusted under 35 U.S.C. 154(b) by 854 days.

(21) Appl. No.: 15/767,681

(22) PCT Filed: Oct. 11, 2016

(86) PCT No.: PCT/EP2016/074371
§ 371 (c)(1),
(2) Date: Apr. 12, 2018

(87) PCT Pub. No.: WO2017/067823
PCT Pub. Date: Apr. 27, 2017

(65) Prior Publication Data
US 2018/0306834 A1 Oct. 25, 2018

(30) Foreign Application Priority Data

Oct. 19, 2015 (DE) .......................... 102015220289.5

(51) Int. Cl.
*G01B 11/00* (2006.01)
*G01P 3/68* (2006.01)
(Continued)

(52) U.S. Cl.
CPC ................ *G01P 3/68* (2013.01); *B21B 39/14* (2013.01); *G01B 11/2433* (2013.01); *G01V 8/10* (2013.01); *B21B 38/00* (2013.01)

(58) Field of Classification Search
USPC .......................................................... 356/28
See application file for complete search history.

(56) References Cited

U.S. PATENT DOCUMENTS 4,548,503 A 10/1985 Liesch
4,821,544 A 4/1989 Tamler
(Continued)

FOREIGN PATENT DOCUMENTS

CN 202162217 3/2012
CN 203648997 6/2014
(Continued)

OTHER PUBLICATIONS

Micro-Epsilon optoCONTROL // Optical precision micrometers Oct. 22, 2014, pp. 1-20.
(Continued)

*Primary Examiner* — James R Hulka
(74) *Attorney, Agent, or Firm* — Abelman, Frayne & Schwab

(57) ABSTRACT

The invention relates to a method and a measuring system for measuring a movable object, for example a lateral guide on the transport path of a casting strand in a metallurgical installation. The system has at least one light source (110) for emitting parallel light beams (130) and a receiving device (120) with a sensor field for receiving the light beams. An evaluation device is used to evaluate the light beams received by the sensor field. In order to be able to make the evaluation simpler and faster, the receiving device is designed to generate an image of the sensor field having the positions of the sensors of the sensor field, which are assigned to the light beams not influenced by the object, and having the positions of the sensors of the sensor field, which are assigned to the light beams which are emitted, but are influenced by the object. The distances between the individual sensors are likewise known on the basis of the known resolution of the sensor field. The evaluation device is designed to evaluate the image with regard to the depth of
(Continued)

penetration of the object into the spatial area spanned by the light beams, the speed and/or the contour of the object (200).

20 Claims, 5 Drawing Sheets

(51) Int. Cl.
*G01B 11/24* (2006.01)
*G01V 8/10* (2006.01)
*B21B 39/14* (2006.01)
*B21B 38/00* (2006.01)

(56) References Cited

U.S. PATENT DOCUMENTS

| | | | |
|---|---|---|---|
| 5,932,888 A | 8/1999 | Schwitzky | |
| 6,175,419 B1* | 1/2001 | Haque | G01D 5/342 |
| | | | 250/559.12 |
| 6,292,262 B1* | 9/2001 | Ciani | G01B 11/14 |
| | | | 356/505 |
| 6,889,441 B2 | 5/2005 | Seiffert | |
| 6,968,625 B2* | 11/2005 | Segerstrom | G01B 11/272 |
| | | | 33/286 |
| 7,126,144 B2 | 10/2006 | De Coi | |
| 8,755,055 B2* | 6/2014 | Khajornrungruang | B23Q 17/2233 |
| | | | 356/634 |
| 9,163,934 B2* | 10/2015 | Hirabayashi | G01B 11/105 |
| 2003/0051354 A1* | 3/2003 | Segerstrom | G01B 11/272 |
| | | | 33/286 |
| 2005/0057743 A1* | 3/2005 | Seiffert | G01B 11/27 |
| | | | 356/138 |
| 2006/0145101 A1* | 7/2006 | De Coi | G01B 11/105 |
| | | | 250/559.12 |
| 2009/0113968 A1 | 5/2009 | Pawelski | |
| 2013/0128285 A1* | 5/2013 | Khajornrungruang | |
| | | | B23Q 17/2233 |
| | | | 356/634 |
| 2014/0347679 A1* | 11/2014 | Hirabayashi | G01B 11/14 |
| | | | 356/635 |

FOREIGN PATENT DOCUMENTS

| | | |
|---|---|---|
| CN | 103990654 | 8/2014 |
| DE | 2140939 | 3/1973 |
| DE | 19704337 | 8/1998 |
| DE | 102011078623 | 1/2013 |
| EP | 298588 | 1/1989 |
| GB | 2100475 | 12/1982 |
| JP | 07323357 | 12/1995 |
| JP | 2002035834 | 2/2002 |
| JP | 2006055861 | 3/2006 |
| JP | 2010155274 | 7/2010 |
| KR | 20040045566 | 6/2004 |
| WO | 9001141 | 2/1990 |

OTHER PUBLICATIONS

Spurstabil, Nov. 1, 2011, 3 pages.
Spaltsensoren (Gapsensors): Columns and Edges on Tracks, Aug. 15, 2011, 2 pages.
Aligning Continuous Casters and Steel Mill Rolls, Hamar Laser, pp. 2-5.

* cited by examiner

METHOD AND MEASURING SYSTEM FOR MEASURING A MOVABLE OBJECT

RELATED APPLICATIONS

This application is a National phase application of International application PCT/EP2016/074371 filed Oct. 11, 2016 and claiming priority of German application DE 102015220289.5 filed Oct. 19, 2015, both applications are incorporated herein by reference thereto.

FIELD OF INVENTION

The invention relates to a method and to a measuring system for measuring a movable object, for example, a lateral guide for cast strands in a metallurgical casting or rolling installation. In addition, the invention relates to such a casting or rolling installation.

BACKGROUND OF RELATED ART

Laser-supported methods and systems for measuring objects, for example, rolls or lateral guides in metallurgical installations are in principle known in the prior art, thus, for example, from the US Patent Application US 2005/0057743 A1 or the Korean Patent Application KR 10 2004 0045566.

The published unexamined German patent application DE 10 2011 078 623 A1 discloses a method and a device for determining the position of a roll in a rolling mill. The measuring device disclosed there uses a light source for emitting a light beam in the form of a collimated light ray. Such a light ray is necessary so that, when the light ray strikes a mirror on the roll to be measured, a defined area of the mirror is irradiated, in such a manner that a defined reflected light beam can reach a receiving device. The receiving device is a two-dimensional receiver which is designed to receive the received light beam resolved two dimensionally. Moreover, an evaluation device is provided which evaluates the image of the light beam received by the receiver unit.

SUMMARY

The object of the invention is to provide an alternative method and alternative measuring system for measuring a movable object, which is characterized by a very simple and time-saving handling.

This aim is achieved in terms of procedure by the method claimed in claim 1. This method provides the following steps:

- activation of at least one light source for emitting parallel light rays which span a spatial area;
- introduction of the object with at least one movement component transverse to the direction of the light rays, into the spatial area spanned by the light rays, so that individual light rays of the emitted light rays on their way to a receiving device are influenced by the object;
- reception of the light rays which are influenced and/or not influenced by the object are received, with the aid of a sensor field of the receiving device, wherein the resolution of the sensor field in at least one spatial direction transverse to the direction of the light rays is known;
- generation of an image of the sensor field with the positions of the sensors of the sensor field which are associated with the light rays not influenced by the object, and with the positions of the sensors of the sensor field which are associated with the light rays which are emitted but are influenced by the introduced object, wherein, based on the known resolution of the sensor field, the spacings between the individual positions of the sensors are also known; and
- evaluation of the image with regard to the depth of penetration of the object into the spatial area spanned by the light rays, the speed and/or the contour of the object is determined.

The light source according to the invention is preferably a laser light source, since such a laser light source automatically already brings along with it the property—essential for the invention—of emitting parallel light rays. Alternatively, the required parallelism of the light rays can also be brought about with the aid of a suitable optical system, in particular a converging lens.

The term " . . . light rays influenced by the object" is understood to mean that the light rays which have been emitted by the light source are interrupted by the object and absorbed, deflected away or deflected onto the receiving device by the object. The " . . . light rays not influenced by the object" go from the light source to the receiving device without being interrupted by the object, optionally after reflection by a device other than the object.

The sensors of the sensor field which are associated with the light rays which are emitted but are influenced by the object are sensors which either receive none of the emitted light rays, since the light rays are absorbed by the object or deflected away from the receiving device, or which receive those emitted light rays which are reflected by the object.

The resolution of the sensor field is represented by the known spacings of the sensors of the sensor field.

The device according to the invention offers the advantage that all the desired information for measuring the object can be determined in a simple manner by evaluating the image. The evaluation of the image can preferably occur fully automatically or semi-automatically, which advantageously simplifies the use of the method considerably for an operator, while also considerably reducing the time required for the determination of the desired information.

According to a first embodiment example, the spacings of the positions of the sensors on the sensor field do not have to be identical at all. It is only important that the spacings are in principle known in the first place, since the knowledge of these spacings is required for the computation of various information described below.

The image with the positions of the sensors of the sensor field can be displayed on a display device for an operator.

For determining the actual depth of penetration of the object into the spatial area spanned by the light beam of the light rays, the image is evaluated in such a manner that the known spacings of all the sensors which are associated with light rays which are emitted but are influenced by the object are added up, in the direction of the movement of the object in the image.

The actual penetration depth thus determined can then be compared with a predetermined target penetration depth. If the actual penetration depth deviates from the target penetration depth, a preferably automatic correction of the final position of the object can occur until the actual position is in agreement with the target position. Preferably, an error message can also be generated and displayed on the display device if the actual penetration depth differs from the target penetration depth.

According to another advantageous design of the method, the actual penetration depth can be determined individually for the different areas of the object by evaluating of the image of the sensor field. These individual actual penetration depths can be compared with associated individual target penetration depths for the different areas of the object. If the individual actual penetration depth is then in agreement with the individual target penetration depth for individual areas of the object, while this is not the case for other areas of the object, then, from this situation, it can be deduced that there is partial wear of the other areas of the object. The amount of wear is then represented by the magnitude of the difference between the individual actual penetration depth and the individual target penetration depth of the other areas of the object.

The determined difference between the target penetration depth and the actual penetration depth relative to the entire object or the amount of wear of the other areas of the object can be stored as offset value. In future positionings of the object, the offset value can then be automatically taken into consideration and thus the object can immediately be positioned accurately.

In addition to the possibility of computing the penetration depth of the object in the spatial area spanned by the light rays, the evaluation of the image according to the invention also offers the possibility of determining the speed with which the object penetrates into the spatial area spanned by the light beam. This occurs according to the invention by the following steps: measurement of the path length which the object travels during its entry into the spatial area, by adding up the known spacings of all the positions of the sensors of the sensor field in the image which are associated with the light rays which are emitted but are influenced by the introduced object, in the direction of the movement of the object during a certain time interval, and determination of the speed by division of the path length by the time interval.

Moreover, the evaluation of the image also provides the possibility of determining the contour of the object.

The method according to the invention can provide that the light rays emitted by the light source, to the extent that they are not interrupted by the object, are deflected with the aid of a reflector before they strike the receiving device.

The object can be, for example, a lateral guide on a transport path, for example, on a roller table for a slab. The light source then has to be installed in such a manner that the light rays extend perpendicularly to the direction of movement of the lateral guide, and that the lateral guide, in its movement, enters the spatial area spanned by the light beam of the light rays.

The aim of the invention is achieved moreover by the measuring system and by a casting or rolling installation with the measuring system according to the invention. The advantages of this measuring system and of the claimed casting or rolling installation correspond to the advantages mentioned above in reference to the claimed method. Additional advantageous designs of the method and of the measuring system are the subject matter of the dependent claims.

BRIEF DESCRIPTION OF THE DRAWINGS

Six figures are attached to the description in which.

The invention is described in detail below in reference to the mentioned FIGS. 1 to 6, in the form of an embodiment example. In all the figures, identical technical elements are designated with identical reference numerals.

DETAILED DESCRIPTION OF THE EMBODIMENTS

Figure 1:
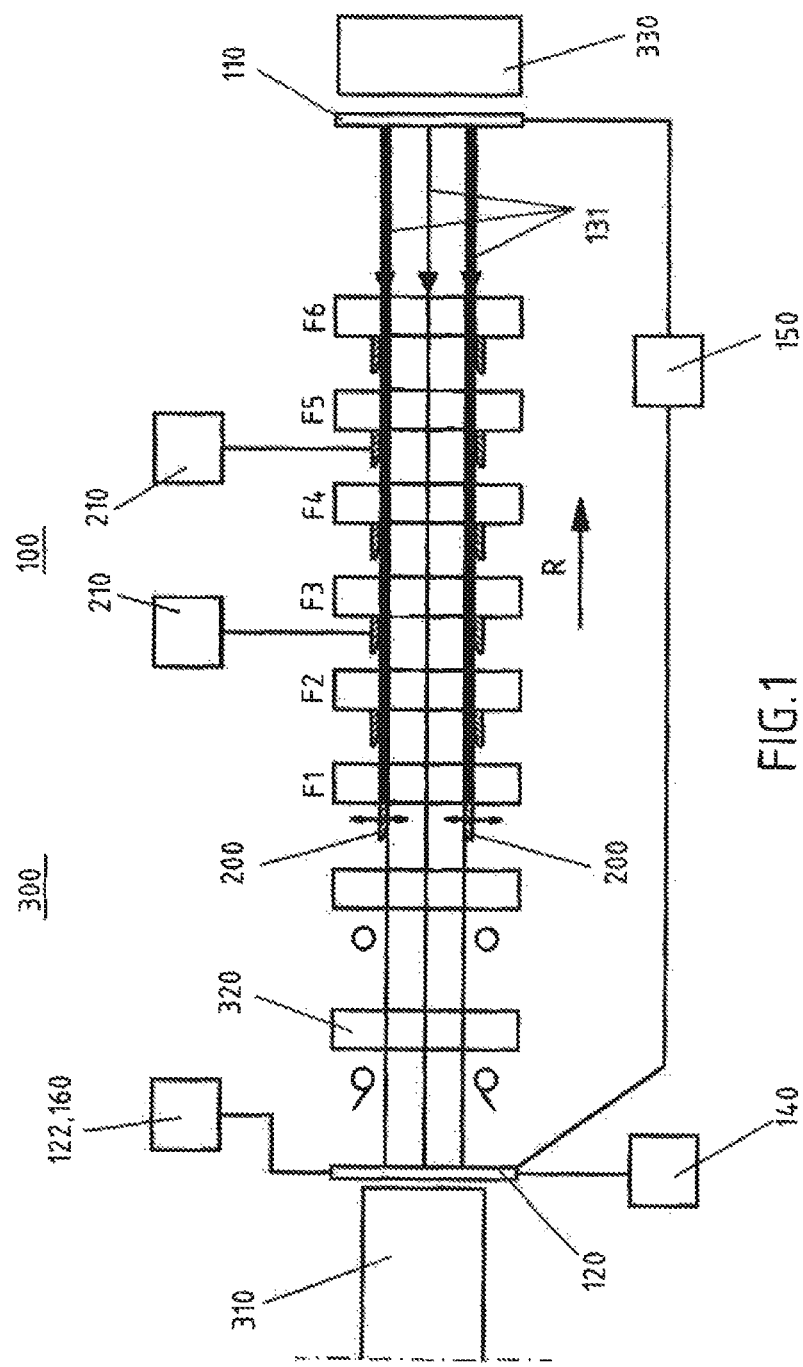
FIG. 1 represents an embodiment example for the use of the method according to the invention and of the measuring system according to the invention in a rolling mill.

FIG. 1 shows a rolling installation for rolling a cast strand or a split cast strand in the form of a slab (not shown). Before the rolling, the cast strand is first heated in an oven 310 to the required rolling temperature. Optionally, the cast strand is then cut by shears 320 to a desired length, which is typically selected with a view to a subsequent desired bundle length. The cast strand is then subjected to a final rolling with the aid of the finishing roll stands F1-F6 to form a metal strip of desired thickness. The metal strip is then wound on a coiling device 330 to form a bundle.

According to FIG. 1, the measuring system 100 according to the invention is built into the mentioned rolling installation 300. In particular, before the coiling device 330, at least one light source 110 is provided for emitting parallel light rays in the opposite direction from the transport direction R of the cast strand in the direction towards a receiving device 120. The light source can be a single light source, the ray of which is broadened, with the aid of optical aids, for example, lenses, to form a beam of preferably separate parallel light rays. Alternatively, the light source can also consist of a plurality of individual light sources; for example, each individual light ray is generated by an individual light source. Preferably, the light source is a laser light source which already by nature emits parallel light rays.

The receiving device 120 is arranged in FIG. 1, as an example, behind the oven 310. The receiving device 120 has a sensor field with a plurality of sensors, wherein the sensors serve to receive at least a portion of the light rays emitted by the light source.

Figure 2:
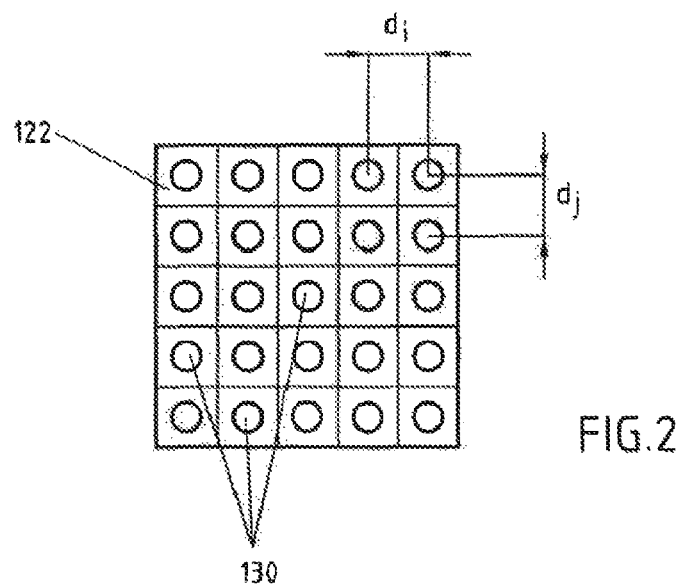
FIG. 2 represents an image of the sensors of the sensor field without influence of the object.
Figure 3:
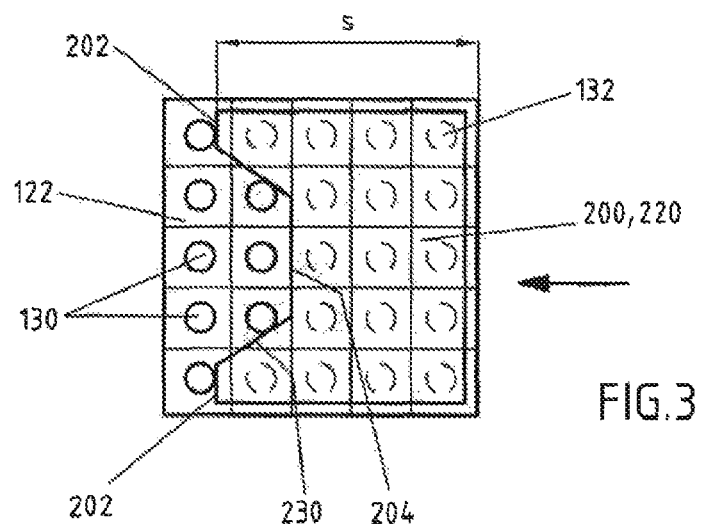
FIG. 3 represents an image of the sensors of the sensor field with influence of the object.

FIGS. 2 and 3 show examples for images 122 of such sensor fields. The spacings of the individual sensors 130 of the sensor field are designated, for example, with $d_i$, $d_j$. These spacings of the sensors in the image can be of equal size, but this does not have to be the case. Instead, it is important that the respective spacings $d_i$, $d_j$ are known.

The image 122 can be visualized on a display device 160 for an operator.

According to the invention, an evaluation device 140 is associated with the receiving device, in order to investigate the image 122, for example with regard to the penetration depth (s) of an object in the spatial area spanned by the light beam of the light rays, the speed and/or the contour of the object.

The transmission of the data of this image to the display device 160 can occur by wire or wirelessly. All the electronic devices of the measuring system 100, in particular the light source 110, the receiving device 120 and the evaluation device 140, can be supplied with electrical energy with the aid of an electrical energy source belonging to the measuring system, for example, a battery or an accumulator.

The images shown in FIGS. 2 and 3 are of two-dimensional design. In principle, they can also be of only one-dimensional design, wherein, in that case, only one line of point-shaped sensors, for example, a horizontal or vertical line of point-shaped sensors, is provided.

Figure 4:
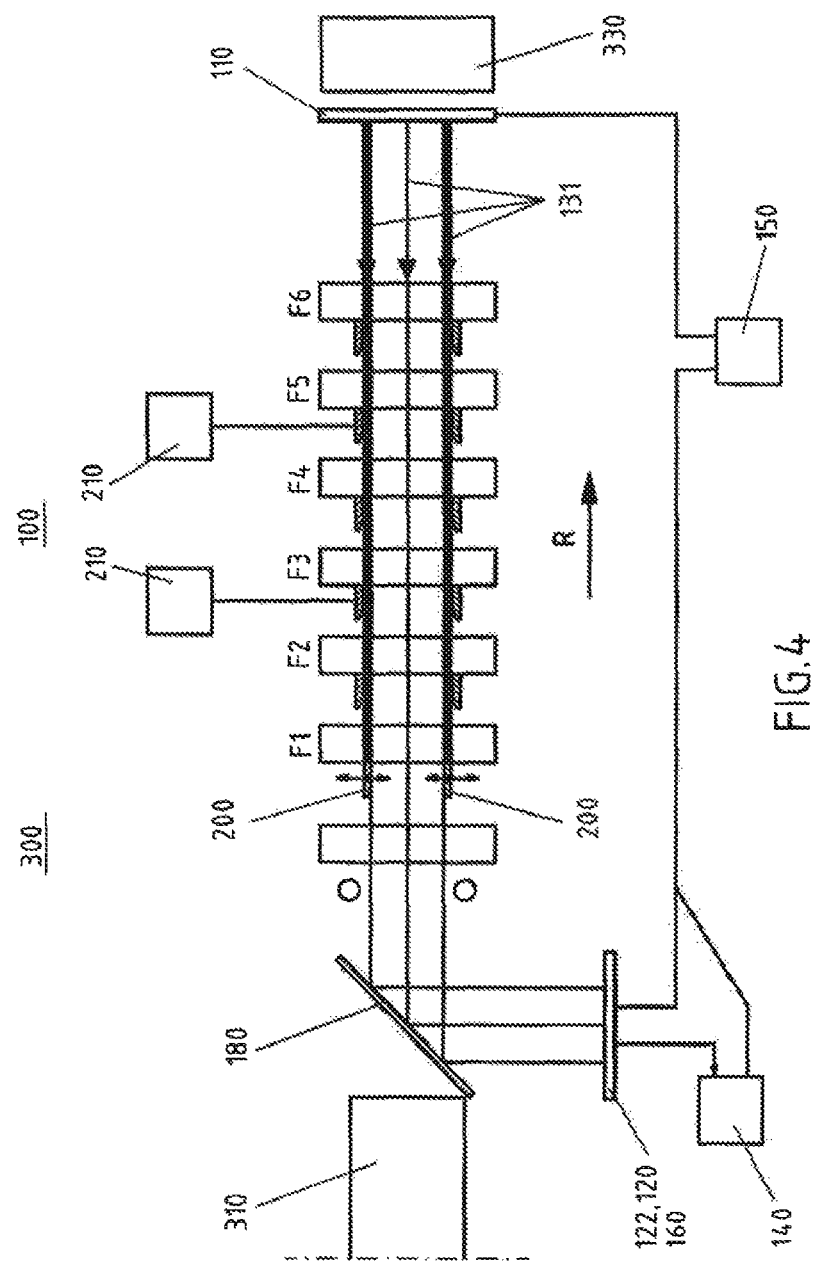
FIG. 4 represents a rolling installation with measuring system according to the invention, wherein the light rays are deflected with the aid of a reflector device onto the receiving device.

In FIG. 1, the light rays 131 emitted by the light source 110 are emitted directly onto the receiving unit 120 and received by said receiving unit. Alternatively, the possibility also exists of emitting the light rays first onto a reflector device 180, which is arranged, in the direction of propagation of the light, behind the object 200 to be measured, in order to deflect the light rays onto the receiving device 120; see FIG. 4.

Figure 5:
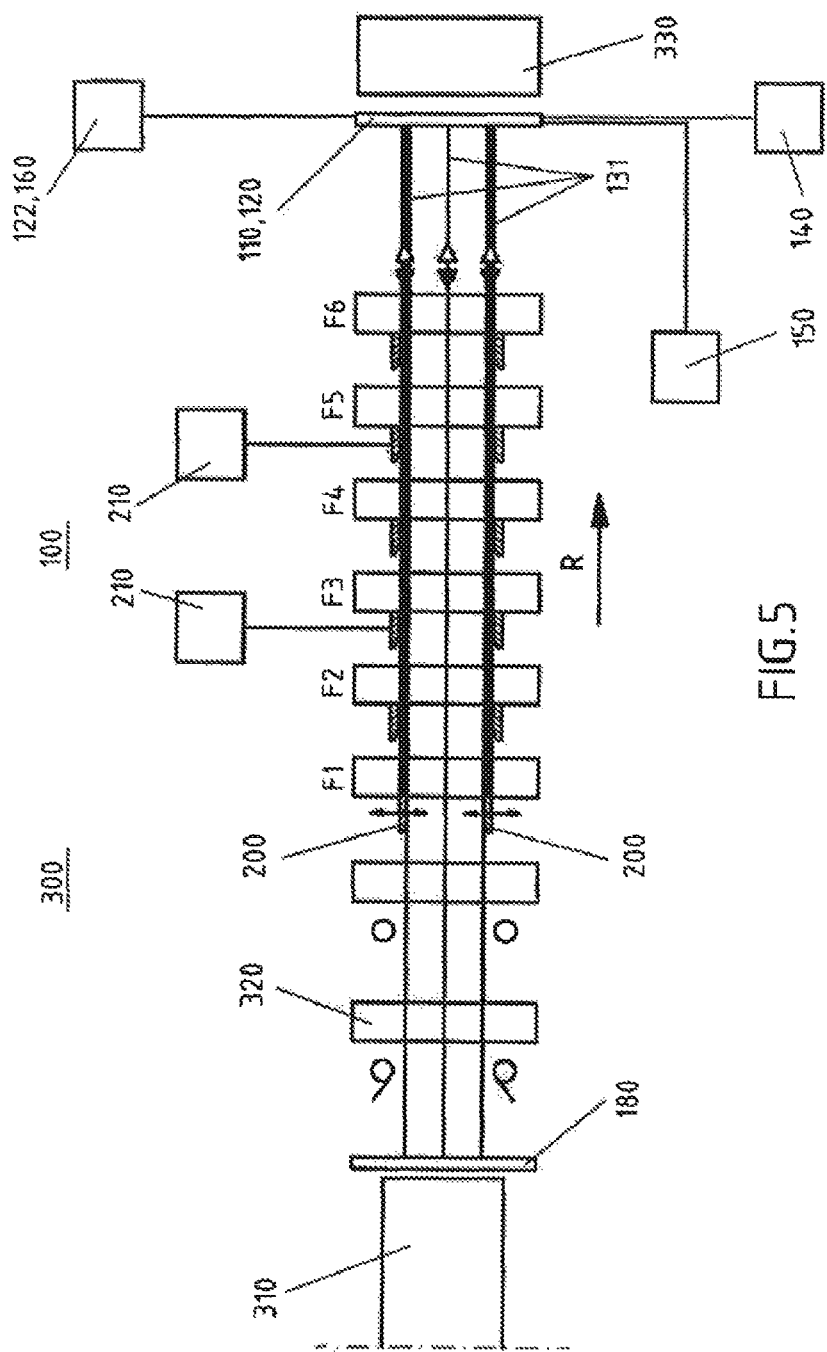
FIG. 5 represents an alternative embodiment example for use of the method according to the invention and of the measuring system according to the invention in a rolling mill.

FIG. 5 shows an additional alternative design of the measuring system to be built into the rolling installation. In particular, the light source 110 and the receiving device 120 here preferably form one structural unit; in particular, they are positioned nearly at the same site, here, for example—viewed in transport direction R of the slab—before the coiling device. On the other end of the area to be monitored by the measuring system, here behind the oven 310, the reflector device 180 is arranged, for reflecting the light rays emitted by the light source 110 back onto the receiving device 120, to the extent that the light rays are not interrupted by the object, for example, the lateral guide. In addition, the receiving device 120 also serves to receive the light rays reflected possibly by the lateral guide, as described below. In this embodiment example too, the display device 160 for the image 122 of the sensor field, the evaluation device 140 and the energy source 150 are associated with the receiving device 120.

Figure 6:
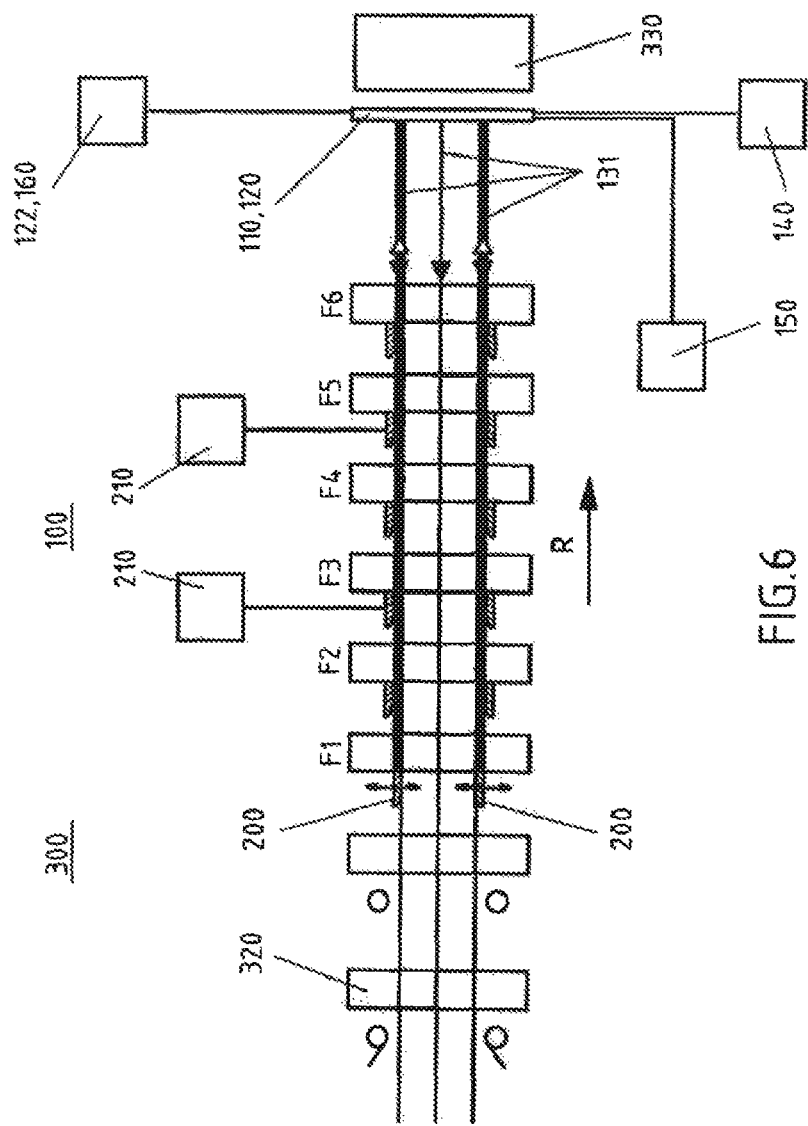
FIG. 6 represents an additional alternative embodiment example for use of the method according to the invention and of the measuring system according to the invention in a rolling mill.

FIG. 6 shows an additional alternative design of the measuring system to be built into the rolling installation. The design according to FIG. 6 differs from the design according to FIG. 5 only in that the reflector device 180 is omitted completely. The result of this is that the light rays emitted by the light source 110 which are not influenced by the object 200 to be measured are not reflected back again onto the receiving device 120, which is assumed to be at the same site as the light source 110 in the embodiment example according to FIG. 6, and received by said receiving device. Thus, the receiving device 120 or the sensor field only receives the portion of the light rays emitted by the light source 110 which are influenced or reflected by the object 200. Otherwise, the statements made for the embodiment example according to FIG. 5 apply analogously to the embodiment example according to FIG. 6.

The described measuring system 100, before its use, is built into the casting or rolling installation and calibrated there. In this context, calibration is understood to mean first of all the fine adjustment or fine positioning of the light source, the receiving device and optionally the reflector device with the aid of associated setting elements, so that they are oriented optimally with respect to one another and can interact.

After the measuring system 100 has been built into the installation 300 and after the calibration of the measuring system, the latter is ready for carrying out the method according to the invention for measuring a movable object, according to FIG. 1, as an example, a movable lateral guide 200 at the edge of a transport path for a cast strand. This method then provides the following sequence of steps:

The light source 110 is activated for emitting parallel light rays 130. The lateral guide 200 is then introduced transversely to the propagation direction of the light rays 130 into the spatial area spanned by the light rays (arrow direction in FIG. 3), so that at least individual light rays of the emitted light rays on their way to the receiving device 120 are interrupted by the lateral guide 200. According to the form of the surface of the lateral guide, the light rays striking there are absorbed or deflected away from the receiving device. The receiving device then does not receive the light rays which are influenced by the lateral guide; this case is represented in FIG. 1. Alternatively, if the surface of the lateral guide is suitable, the light rays can also be reflected by said lateral guide towards the receiving device and received by the receiving device; this case is represented in FIG. 5.

In both cases, the receiving device 120 generates the image 122, on the one hand, with the positions of the sensors of the sensor field which receive the light rays which are emitted and not influenced by the lateral guide. These positions are indicated in FIG. 3 by the sensors 130. On the other hand, the positions 132 of the sensors of the sensor field which are associated with the light rays which are emitted but are influenced by the object 200 or the lateral guides are also represented in the image 122. These sensors in positions 132 receive either none of the emitted light rays, for example, because the light rays are absorbed by the surface of the lateral guide or have been deflected away from the receiving device, or they receive the light rays which are reflected by the lateral guide onto the receiving device. The positions 130 of the sensors which receive the light rays without interference by the lateral guide, and the positions of the sensors which do not receive the emitted light rays or which receive the emitted light rays after reflection on the lateral guide, are distinguished clearly in the image 122, as shown in FIG. 3. Alternatively or additionally to the individual positions of the sensors, it is also possible to represent (only) the shadow 220 or the outline of the lateral guides in the image, as also shown in FIG. 3. The outline of the lateral guide is represented by the boundary line between the two positions 130 and 132.

The image 122 thus generated is evaluated subsequently by the evaluation device 140 according to the invention with regard to different aspects.

On the one hand, the evaluation device 140 is designed to determine the image with regard to the actual penetration depth (s) of the object 200 or of the lateral guides into the spatial area spanned by the light beam of the light rays. In particular, the determination occurs by adding up the known spacings $d_i$, $d_j$ of all the emitted but not received light rays in the direction of the movement of the lateral guides in the image. This movement direction is indicated in FIG. 3 by the arrow pointing to the left shown there. The accuracy or the resolution with which the penetration depth (s) can be determined depends on the density or on the spacings of the sensors in the sensor field or in the image 122. In FIGS. 2 and 3, the density of the sensors is kept fairly small, in order not to affect the clarity; in practice, it is possible to select the spacings $d_i$, $d_j$ to be very small, for example, in the micrometer or millimeter range, and the sought penetration depth (s) can accordingly be computed accurately or with high resolution.

The penetration depth (s) determined by evaluation of the image 122 is the so-called actual penetration depth (s). The method according to the invention can provide that this actual penetration depth is compared with a predetermined target penetration depth, wherein this target penetration depth represents a target position for the object 200 or the lateral guide, for example, in a casting or rolling installation.

The determined deviation of the actual penetration depth from the target penetration depth as a rule means that the target position has not been reached correctly, and accordingly, an actuator 210, which is used for positioning the lateral guides 200, has to be re-positioned or re-calibrated. In the context of the calibration, which can preferably also occur automatically, the actuator 210 is set in such a manner that the object again reaches its predetermined target position, i.e., the adjustment of the actuator occurs until the actual position is in agreement with the target position. The initially detected deviation of the actual penetration depth from the target penetration depth can also be stored as offset value in a control for the actuator, so that it can also be considered on a regular basis for future activations of the actuator. The offset value can also serve for generating an error message, which can be displayed on the display device 160, for example.

The determination of the actual penetration depth can occur individually or separately for different areas 202, 204 of the object, see FIG. 3, in that the image 122 is evaluated accordingly with the aid of the evaluation device 140. In particular, for the different areas 202, 204, individual actual penetration depths can be determined and compared with associated individual actual target penetration depths for the different areas. If, for individual areas of the object, for example, for the area 202 in FIG. 3, it is noted that the individual actual penetration depth is in agreement with the individual target penetration depth, but, on the other hand, at the same time it is noted for the area 204 that the actual penetration depth determined individually for this area is not in agreement with the associated individual target penetration depth, then this makes it possible to conclude that there is partial wear of the area 204 of the object. The amount of wear then corresponds to the difference between the individual actual penetration depth and the individual target penetration depth in this area 204. In the embodiment example shown in FIG. 3 in which the object 200 is the lateral guide on the transport path of a cast strand, the area 204 is typically directly in contact with the cast strand; this results in wear. By comparison, the areas 202 are typically not subject to wear, since these areas are not in contact with the cast strand. In the described example, the actuator 140 is then set in such a manner that the difference between the actual penetration depth and the target penetration depth in the area 204 of the object 200 becomes zero, since, as mentioned, this area is relevant for the actual guiding of the cast strand. On the other hand, in this case, a deviation of the actual penetration depth from the target penetration depth for the area 202 of the lateral guide is then acceptable, since this deviation is relevant for the intended purpose, namely the precise guiding of the cast strand.

The difference between the target penetration depth and the actual penetration depth relative to the entire object or the amount of wear of a certain section of the object can, as described, be determined by evaluation of the image. The difference or the amount of wear is then preferably stored as offset value in the control associated with the actuators, so that it can be taken in consideration automatically in the future in preferably automatic re-positioning procedures.

Irrespective of the possibility of determining the actual penetration depth, the evaluation of the image 122 by the evaluation device 140 also makes it possible to determine the speed with which the object or the lateral guide 200 penetrates into the spatial area spanned by the light rays. For this purpose, one determines a path length traveled by the object 200 when it enters the spatial area, which is measured by adding up the known spacings of all the sensors in the sensor field which are associated with the light rays which are influenced or are not influenced by the object or the light rays which are not influenced by the object, in the direction of movement of the object during a certain time interval. For determining the speed, the measured path length is then divided by the time interval measured. The path length can be the entire penetration depth or a partial length thereof.

Moreover, the evaluation of the image also makes it possible to determine the contour of the object which penetrates into the spatial area spanned by the light rays. The contour 230 corresponds to the boundary line between the positions 130 of the sensors which receive the light rays which are not influenced by the object. and the positions 132 of the sensors which are associated with the light rays which are influenced by the object, as can be seen in FIG. 3.

LIST OF REFERENCE NUMERALS

100 Measuring system
110 Light source
120 Receiving device
122 Image of the sensor field
130 Sensor
131 Light ray
132 Position of light ray not received or of received reflected light rays
140 Evaluation device
150 Energy source
160 Display device
180 Reflector device
200 Movable object, for example, lateral guide
202 Area of the object without wear
204 Area of the object with wear
210 Actuator
220 Shadow/outline of the lateral guide
230 Contour
300 Rolling installation
310 Oven
320 Shears
330 Coiling device
$d_i$ Spacing
$d_j$ Spacing
s Penetration depth
R Transport direction of the cast strand

We claim:

1. A method for measuring a movable object comprising the steps of:
 activating a light source for emitting parallel light rays which span a spatial area, wherein the light source is positioned such that the light rays extend perpendicularly to a movement direction of the movable object;
 providing a light receiving device to receive the emitted light rays from the light source;
 moving the object on a transport path for a slab in a casting or rolling installation with at least one movement component, which is perpendicular to the direction of the light rays, into the spatial area spanned by the light rays so that individual light rays of the emitted light rays directed to the light receiving device are influenced by the object;
 receiving the light rays which are at least one of influenced and not influenced by the object by a sensor field of the light receiving device, wherein resolution of the sensor field in at least one spatial direction transverse to the direction of the light rays is known, wherein resolution of the sensor field is defined by predetermined spacings between individual positions of the sensors;

generating an image of the sensor field with positions of sensors of the sensor field which are associated with the light rays not influenced by the object, and with the positions of the sensors of the sensor field which are associated with the light rays which are emitted but influenced by the introduced object; and evaluating the image to determine actual depth of penetration of the object into the spatial area spanned by the light rays.

2. The method according to claim 1, wherein the spacings of the sensors are non-equidistant to one another.

3. The method according to claim 1, further comprising the step of displaying the image on a display device.

4. The method according to claim 1, wherein step of evaluating the image to determine the actual depth of penetration of the object into the spatial area spanned by the light beam of the light rays includes adding up the known predetermined spacings of all the positions of the sensors of the sensor field shown in the image which are associated with the light rays which are emitted but are influenced by the object in the direction of movement of the object.

5. The method according to claim 4, further comprising:
comparing the determined actual penetration depth with a predetermined target penetration depth; and
correcting a final position of the of object when the actual penetration depth differs from a target penetration depth until the actual position corresponds with the target position.

6. The method according to claim 5, further comprising determining and storing, as an offset value for consideration in future positioning of the object, the difference between the target penetration depth and the actual penetration depth relative to the entire object or the amount of wear of the other areas of the object.

7. The method according to claim 4, further comprising:
evaluating and comparing the actual penetration depths of different areas of the object with associated individual target penetration depths for the different areas of the object; and
identifying partial wear of the other areas of the object by determining individual areas of the object in which the individual actual penetration depth corresponds with the individual target penetration depth, and other areas of the object in which the individual penetration depth differs from the individual target penetration depth; and
computing a magnitude of the difference between the individual actual penetration depth and the individual target penetration depth of the other areas of the object as indicia of the partial wear of the other areas of the object.

8. The method according to claim 4, further comprising generating a message indicating at least partial wear of the object upon determination that the actual penetration depth of the object in the transport path is smaller than the target penetration depth.

9. The method according to claim 1, wherein a preparation process prior to measuring the movable object comprises the steps of:
placing the light source and of the receiving device with the sensor field in the transport path of the slab;
aligning the light source and of the sensor field such that the sensor field can receive the light rays of the light source; and
arranging the sensor held in a fixed relative position with respect to a starting position of the movable object such that the object, when reaching its final position, lies at least partially within the spatial area spanned b the light rays.

10. The method according to claim 1, further comprising deflecting the light rays emitted by the light source, to the extent that they are not interrupted by the object, to the receiving device.

11. The method of claim 1, wherein the object is a lateral guide.

12. The method of claim 1, wherein the spacings between the positions of the sensors are equidistant apart.

13. A measuring system for measuring at movable object comprising:
at least one light source for emitting parallel light rays which span a spatial area;
a light receiving device with a sensor field formed by a plurality of sensors having predetermined spacings therebetween, the light receiving device configured to receive at least some of the emitted light rays from the at least one light source, wherein resolution of the sensor field in at least one spatial direction transverse to the direction of the light rays is predetermined; and
an evaluation device for evaluating the light rays received by the receiving device;
wherein the light receiving device is configured to generate an image of the sensor field with sensors of the sensor field which receive the light rays which are not influenced by the object, and with sensors of the sensor field which receive the light rays which are emitted but are influenced by the object, wherein, the known resolution of a sensor field is defined by predetermined spacings between the sensors; and
wherein the object is on a transport path for a slab in a casting or rolling installation; the light source is positioned such that the light rays extend perpendicularly to the movement direction of the lateral guide; the object during movement enters the spatial area spanned by the light rays; and the evaluation device evaluates the image to determine depth of penetration of the lateral guide into the spatial area spanned by the light rays.

14. The method of claim 13, wherein the object is a lateral guide.

15. The measuring system according to claim 13, wherein the at least one light source is a laser light source for emitting a light beam of parallel light rays having a one-dimensional or two-dimensional cross section.

16. The measuring system according to claim 13, further comprises an electrical energy source including at least one of a battery an an accumulator.

17. The measuring system according to claim 13, further comprising a display device electronically coupled with the receiving device and/or the evaluation device for displaying the image.

18. The measuring system according to claim claim 13, further comprising a reflector device which is arranged in a propagation direction of the light rays, behind the object, for deflecting the light rays which are not influenced by the object onto the sensor field of the receiving device.

19. The measuring system according to claim 13, wherein the light source and the receiving device are finely adjusted with setting elements to provide optimal alignment with respect to one another.

20. A casting or rolling installation for producing or processing a cast strand comprising:

a transport path for the cast strand with a lateral guide on an edge of the transport path for guiding the cast strand, wherein the lateral guides can be moved by an actuators in a direction transverse to a line of the transport path into and out of said transport path;

a measuring system comprising:

at least one light source for emitting parallel light rays which span a spatial area;

a receiving device with a sensor field for receiving at least some of the emitted light rays, the sensor field being defined by a plurality of spaced-apart sensors, wherein resolution of the sensor field in at least one spatial direction transverse to the direction of the light rays is known; and an evaluation device for evaluating the light rays received by the receiving device;

wherein the receiving device is configured to generate an image of the sensor field with at least one of a first portion of the plurality of the the sensors of the sensor field which receive the light rays which are not influenced by the object, and a second portion of the plurality of the sensors of the sensor field which are receive with the light rays which are emitted but are influenced by the object, wherein, spacings between the individual sensor positions are known and define the resolution of the sensor field;

wherein the object is the lateral guide on the transport path for a slab in a casting or rolling installation; the light source is installed such that the light rays extend perpendicularly to a movement direction of the lateral guide; the lateral guide, in its movement, enters a spatial area spanned by the light rays; the evaluation device being configured to evaluate the image and determine depth of penetration of the lateral guide into the spatial area spanned by the light rays; and wherein the light source and the receiving device are aligned such that the emitted light rays propagate perpendicularly to the movement direction of the lateral guides that the lateral guides is moved transversely into the spatial area spanned by the light rays.

* * * * *